United States Patent
Cho et al.

(10) Patent No.: US 11,490,008 B2
(45) Date of Patent: *Nov. 1, 2022

(54) METHOD FOR PHOTOGRAPHING PANORAMIC IMAGE BY PREVENTING EXCESSIVE PERPENDICULAR MOVEMENT

(71) Applicants: Samsung Electronics Co., Ltd., Gyeonggi-do (KR); Seoul National University Industry Foundation, Seoul (KR)

(72) Inventors: Sung-Dae Cho, Gyeonggi-do (KR); Soo-Kyun Kim, Seoul (KR); Jae-Won Moon, Gyeonggi-do (KR); Yun-Je Oh, Gyeonggi-do (KR); Hee-Won Jung, Gyeonggi-do (KR); Sang-Hwa Lee, Seoul (KR); Nam-Ik Cho, Seoul (KR); Seong-Jong Ha, Gyeonggi-do (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/914,680

(22) Filed: Jun. 29, 2020

(65) Prior Publication Data

US 2020/0329197 A1    Oct. 15, 2020

Related U.S. Application Data

(63) Continuation of application No. 16/240,957, filed on Jan. 7, 2019, now Pat. No. 10,701,264, which is a (Continued)

(30) Foreign Application Priority Data

Apr. 12, 2007 (KR) .................. 10-2007-0036056

(51) Int. Cl.
*H04N 5/232* (2006.01)
*G03B 37/04* (2021.01)
(Continued)

(52) U.S. Cl.
CPC ......... *H04N 5/23238* (2013.01); *G03B 37/04* (2013.01); *G06K 9/6201* (2013.01);
(Continued)

(58) Field of Classification Search
CPC .... G02B 13/06; G03B 7/099; G03B 7/09908; G03B 15/00; G03B 37/00; G03B 37/02;
(Continued)

(56) References Cited

U.S. PATENT DOCUMENTS

| 6,930,703 B1 * | 8/2005 | Hubel | G03B 37/04 |
| | | | 348/E5.042 |
| 2004/0189849 A1 * | 9/2004 | Hofer | H04N 5/232945 |
| | | | 348/333.03 |

(Continued)

FOREIGN PATENT DOCUMENTS

| EP | 0 734 155 A1 | 9/1996 |
| EP | 1 613 060 A1 | 1/2006 |

(Continued)

*Primary Examiner* — Dramos Kalapodas
(74) *Attorney, Agent, or Firm* — Cha & Reiter, LLC

(57) ABSTRACT

Disclosed is a method for photographing a panoramic image including the steps of recognizing movement of a corresponding photographing apparatus by comparing a current real-time input image with a previous image through a motion estimation mechanism with exposure compensation, determining a time to photograph each next picture by determining whether movement in a photography direction reaches a preset threshold value, and photographing each next picture by manual or automatic operation at the determined time.

24 Claims, 5 Drawing Sheets

Related U.S. Application Data continuation of application No. 15/338,608, filed on Oct. 31, 2016, now Pat. No. 10,178,308, which is a continuation of application No. 13/613,608, filed on Sep. 13, 2012, now Pat. No. 9,482,939, which is a continuation of application No. 12/082,103, filed on Apr. 7, 2008, now Pat. No. 8,279,264.

(51) Int. Cl.
    *G06K 9/62*     (2022.01)
    *G06T 7/20*     (2017.01)
    *H04N 5/76*     (2006.01)

(52) U.S. Cl.
    CPC .......... G06T 7/20 (2013.01); H04N 5/232933 (2018.08); H04N 5/76 (2013.01)

(58) Field of Classification Search
    CPC .......... G03B 37/04; G06F 13/00; G06K 9/62; G06K 9/6201; G06T 1/0007; G06T 3/4038; G06T 7/20; H04L 67/00; H04L 67/02; H04N 1/00127; H04N 1/00204; H04N 1/00307; H04N 5/76; H04N 5/232; H04N 5/351; H04N 5/2259; H04N 5/2628; H04N 5/3452; H04N 5/23232; H04N 5/23238; H04N 5/23248; H04N 5/23293; H04N 5/232933; H04N 5/225; H04N 5/262
    USPC .............................................. 348/36; 396/20
See application file for complete search history.

(56) References Cited

U.S. PATENT DOCUMENTS

| | | | |
|---|---|---|---|
| 2006/0023090 | A1 | 2/2006 | Takata et al. |
| 2006/0039693 | A1* | 2/2006 | Lee .................. H04N 5/232939 348/E5.042 |
| 2006/0050152 | A1* | 3/2006 | Rai .................. H04N 5/232945 348/E5.047 |
| 2006/0064273 | A1* | 3/2006 | Sugiura .............. H04N 5/23238 348/E5.042 |
| 2006/0078224 | A1 | 4/2006 | Hirosawa |
| 2006/0268129 | A1 | 11/2006 | Deng |
| 2007/0147812 | A1* | 6/2007 | Nenonen .............. H04N 5/3452 396/20 |
| 2008/0158342 | A1* | 7/2008 | Jeong ................. H04N 5/23238 348/E7.091 |
| 2016/0205320 | A1* | 7/2016 | Sento .................. H04N 5/3415 348/36 |

FOREIGN PATENT DOCUMENTS

| | | |
|---|---|---|
| EP | 1 940 152 A2 | 7/2008 |
| JP | 6-105214 A | 4/1994 |
| JP | 2004-222051 A | 8/2004 |
| JP | 2005-311789 A | 11/2005 |
| JP | 2006-217478 A | 8/2006 |
| KR | 2002-0083261 A | 11/2002 |
| KR | 10-2005-0013861 A | 2/2005 |
| KR | 10-0683850 B1 | 2/2007 |

\* cited by examiner

METHOD FOR PHOTOGRAPHING PANORAMIC IMAGE BY PREVENTING EXCESSIVE PERPENDICULAR MOVEMENT

CROSS REFERENCE TO RELATED APPLICATIONS

This application is a Continuation of U.S. patent application Ser. No. 16/240,957 filed on Jan. 7, 2019 and assigned U.S. Pat. No. 10,701,264, which is a Continuation of U.S. patent application Ser. No. 15/338,608 filed on Oct. 31, 2016 and assigned U.S. Pat. No. 10,178,308 issued on Jan. 8, 2019, which is a Continuation of U.S. patent application Ser. No. 13/613,608 filed on Sep. 13, 2012 and assigned U.S. Pat. No. 9,482,939 issued on Nov. 1, 2016 which claims the benefit of the earlier U.S. patent application Ser. No. 12/082,103 filed on Apr. 7, 2008 and assigned U.S. Pat. No. 8,279,264 issued on Oct. 2, 2012 which claims the benefit of the earlier filing date, pursuant to 35 USC 119 filed with the Korean Intellectual Property Office on Apr. 12, 2007 and assigned Serial No. 10-2007-0036056, the contents of which are incorporated herein by reference.

BACKGROUND

1. Field of the Invention

The present invention relates to digital image photography and more particularly to a method for photographing a panoramic image.

2. Description of the Related Art

Generally, a photographing unit of a digital-image photographing apparatus can obtain a picture formed within a focal length of its lens. The obtained picture has a viewing angle range of about 30~50 degree in the case of a general camera, which is narrower than the viewing angle of a human being (about 150~200 degree). Methods for creating an image with an angle of view similar to or more than the viewing angle of a human require, photographing multiple pictures with an appropriately changed photographing angle, and then putting together the photographed pictures in consecutive order to create one image. Such a method is referred to as panoramic photography.

In a panoramic image photographing mode, a digital-image photographing apparatus photographs multiple pictures in consecutive order in a horizontal or vertical direction, and stores the pictures in a memory. Later, the pictures stored in the memory are provided to an image processor, and are put together into one image. The image processor may be internal or external to the photographing apparatus.

In order to eliminate the difference in color and image boundaries between the pictures, multiple pictures are photographed in such a manner that the boundaries are appropriately overlapped, and the pictures are aligned in such a manner that the overlapped portions are synchronized with each other. Then, after the image processing operations, such as stitching and blending, the multiple pictures are smoothly put together into one image.

In photographing such a panoramic image, it is important to photograph respective pictures in such a manner that the pictures are aligned as accurately as possible. Therefore, a user may manually photograph an image using an auxiliary device such as a tripod. In addition, recently, there is provided a method for rotating a photographing apparatus in accordance with each picture to be photographed in panoramic photography, by using auxiliary devices. The devices are attached to a tripod, etc. and a corresponding photographing apparatus is mounted thereon. An example of such a technology is Korea Patent Application No. 2003-0052444, entitled "Camera and Method for Photographing Panorama Picture" (Application date: Jul. 29, 2003, Applicant: Samsung-Techwin, and Inventor: Bae Sung-chul). Another method a photographing apparatus is provided with a device for detecting a rotation angle, and a user-preset rotation angle of the photographing apparatus. Accordingly, in panoramic photography, when a portable terminal is rotationally moved according to the user-set rotation angle, each picture is photographed.

There is further provided a method for more accurately aligning respective pictures in panoramic photography, without an auxiliary device or additional hardware combined with a corresponding photographing apparatus. In this method, a part of the boundary of a previously photographed image is displayed while appropriately overlapping an image to be currently photographed so that a user can adjust an appropriate photography position by synchronizing the previously photographed image and the currently photographed image with each other. An example of such a technology is United States Patent Publication No. 2004-0189849, entitled "Panoramic Sequence Guide" (Application date: Mar. 31, 2003, and Inventor: Gregory V. Hofer).

Such panoramic photography requires a user to be more sophisticated and skillful in the operation than for photography of a single-photo, and thus a more convenient operation mechanism and a more efficient photography mechanism are needed.

SUMMARY

The present invention provides a method for more easily and accurately recognizing the movement of a camera in photographing a panoramic image, so as to use the recognized movement in photographing the panoramic image.

In accordance with an aspect of the present invention, there is provided a method for photographing a panoramic image, the method including the steps of recognizing movement of a corresponding photographing apparatus by comparing a current real-time input image with a previous image through a motion estimation mechanism with exposure compensation, in photographing each picture included in a panoramic image, determining whether it is time to photograph each picture by determining whether movement in a photography direction reaches a preset threshold value, according to the recognized movement of the corresponding photographing apparatus; and photographing each picture by manual or automatic operation at a moment when the picture is photographed.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION

Exemplary embodiments of the present invention are described in detail with reference to the accompanying drawings. For the purposes of clarity and simplicity, a detailed description of known functions and configurations incorporated herein is omitted to avoid making the subject matter of the present invention unclear.

Figure 1:
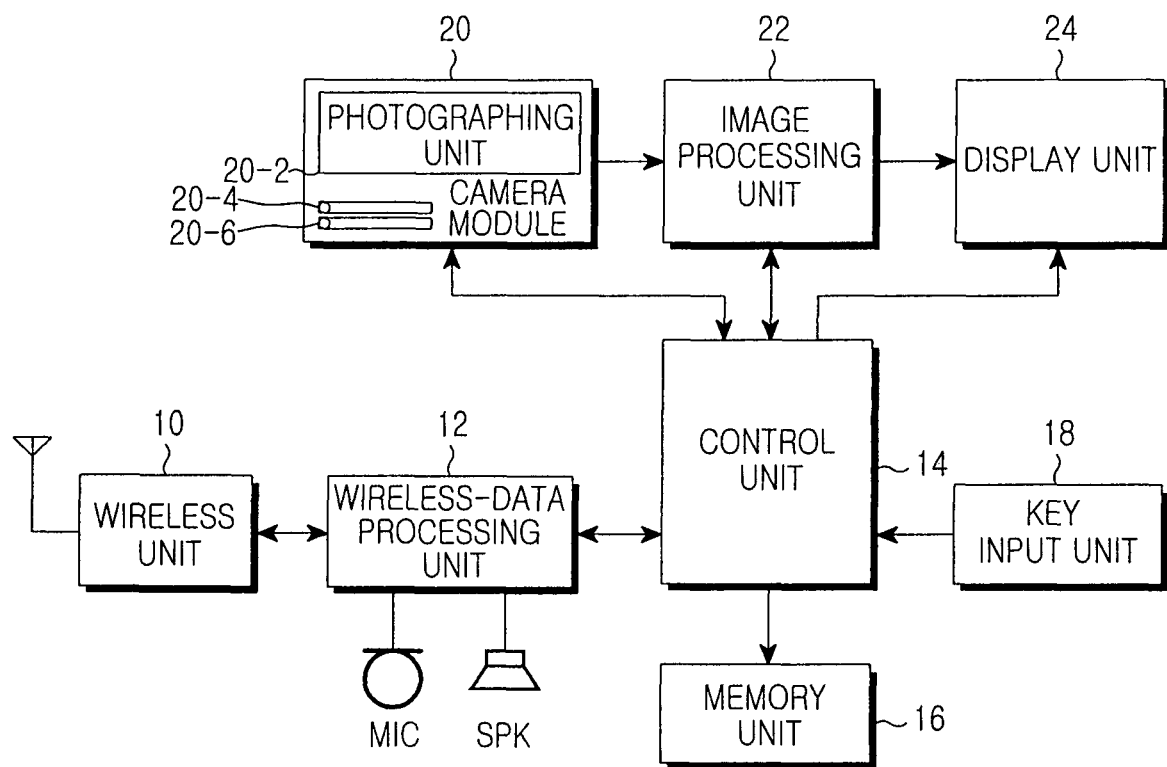
FIG. 1 is a block diagram illustrating a mobile terminal according to the present invention.

FIG. 1 is a block diagram illustrating a mobile terminal according to the present invention. In the present invention, a mobile terminal as shown in FIG. 1, among various apparatuses provided with a digital image photography function, will be considered as an example. A mobile terminal provided with a digital image photography function according to the present invention includes a camera 20, an image processing unit 22, a display unit 24, a control unit 14, a memory unit 16, a key input unit 18. The mobile terminal in this illustrated case also includes a wireless unit 10, and a wireless-data processing unit 12.

The wireless unit 10 modulates a voice message, an SMS message, and control data of a user to a wireless signal, and transmits the wireless signal to a base station (not shown) of a mobile communication network. Also, the wireless unit 10 receives a wireless signal from the base station, demodulates the wireless signal in to a voice message, an SMS message, and control data, and outputs the voice message, the SMS message, and the control data. The wireless-data processing unit 12 under the control of the control unit 14 decodes voice data received from the wireless unit 10, outputs the data as audible sounds through a speaker, turns a user's voice signal input from a microphone into data, and outputs the data to the wireless unit 10. Also, the wireless-data processing unit 12 provides the SMS/control data input from the wireless unit 10 to the control unit 14.

The camera 20, under the control of the control unit 14, performs the function of a general digital camera, and photographs visible light input from an outside object. The camera 20 is provided with a photographing unit 20-2 including a CCD image sensor, etc., and also may be provided with an illumination sensor 20-4 for measuring illumination, and a distance sensor 20-6 for measuring a focal length from a subject. The image processing unit 22 processes output image data within the camera 20, and converts the data into digital image data with an appropriate format.

The key input unit 18, by which a user inputs telephone numbers or characters, includes keys for inputting number/character information and function keys for setting a variety of functions, and outputs such input signals to the control unit 14. The display unit 24 may include a display component such as a liquid crystal display (LCD), and displays messages about various operation states of a corresponding terminal and photographed digital image data, under the control of the control unit 14.

The control unit 14 performs the function of controlling overall operation of a mobile communication terminal by generally controlling operations of the respective functional units. In other words, the control unit 14 performs an operation according to signals of number/menu selection input through the key input unit 18, performs an operation according to an outside photography signal input through the camera 20, and outputs a camera-photographed image and image signals required for various operations via the display unit 24. When necessary, the control unit 14 accesses content to be output from the memory unit 16, or stores content in the memory unit 16. The memory unit 16 stores many programs and data related to operations of the control unit 14, and also stores information required for the use of a mobile terminal, and information on a photographed image of the camera.

Generally, a mobile terminal with such a configuration performs an operation related to a general mobile communication service, including a camera function. Besides the above functions, the control unit 14 performs may perform panoramic photography operation according to the present invention. Also, according to the present invention, the memory unit 16 stores operation programs and relevant information for a panoramic photography operation in the control unit 14, and when necessary, outputs such information to the control unit 14.

In panoramic photography according to the present invention, a subject picture is input to the mobile terminal in real time, like a moving picture. When the mobile terminal is moved by a user in a panoramic photography direction, (or when the mobile terminal is mounted to an additional device and is automatically rotationally moved by the device), the movement of the mobile terminal is recognized by comparing a current input image with a previous image. Then, after determining the direction and extent of the movement, an operation of obtaining consecutive pictures is performed in order to create an appropriate panoramic image. Hereinafter, a panoramic photography operation according to the present invention will be described in detail with reference to the accompanying drawings.

Figure 2:
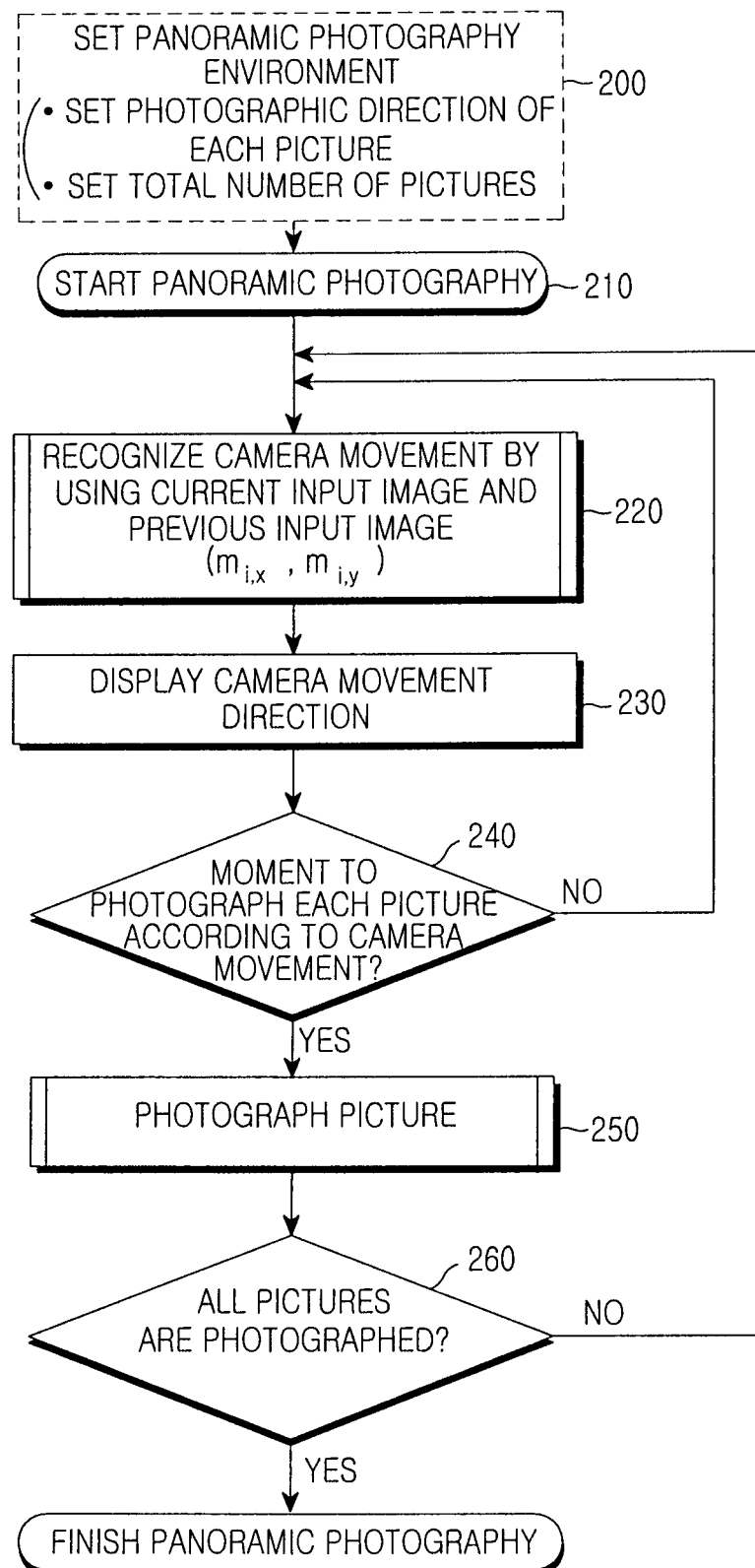
FIG. 2 is a flow diagram illustrating an operation of panoramic photography according to an embodiment of the present invention.

FIG. 2 is a flow diagram illustrating an operation of panoramic photography according to an embodiment of the present invention. Step 200 is performed before actual panoramic photography is begun, and is for setting various photographic environments for panoramic photography. In step 200, the direction (such as, an upward/downward/left/right direction) where pictures included a panoramic image are put together is determined. Also, the number of photographed pictures to be included in creation of a panoramic image is determined.

Such an environment setup operation for panoramic photography in step 200 is performed through menu items (usually prepared in a mobile terminal) for setting various functions. For example, when a so-called 'environment setup mode for panoramic photography' is selected from among sub-menus of camera photography menus, a user can input respective environment settings. A setup and operation program, which are for displaying corresponding menu items and recognizing a user's key input on the key input unit, are previously prepared in the mobile terminal. Also, a part or the whole of such environment items for panoramic photography, which is set by a user in step 200, may be previously provided as fixed settings appropriately established by a developer.

In step 210, a user selects a so-called 'panoramic photography mode' from among sub-menus of camera photography menus of the mobile terminal, and starts panoramic photography by photographing the first picture of a panoramic image. The first picture of a panoramic image is stored by a shutter operation of a user in a way similar to usual photography, and the following pictures are processed by a panoramic photography mechanism according to the present invention. When a panoramic image is photographed, images input to a photographing apparatus in real-time from the start time are stored in the memory unit.

Later, such images are used for obtaining movement information of the photographing apparatus.

In step 220, according to the present invention, images are input to the photographing apparatus, like a video image, and the movement of a corresponding photographing apparatus (e.g., a camera) is recognized by using both a current input image and a previous input image. In recognizing the movement of the camera in step 220, a motion vector between matching (most similar) blocks is detected by comparing image blocks having a appropriately set size with each other within a current frame and a previous frame. Such a mechanism may be similar to a mechanism used for a movement estimation/compensation technology in encoding and decoding of a general video image. In the present invention, a motion vector corresponding to a horizontal direction, that is, x-axis, is defined as $m_{i,x}$, and a motion vector corresponding to a vertical direction, that is, y-axis, is defined as $m_{i,y}$ (herein, i indicates the number of each frame).

In step 230, for panoramic photography in accordance with the movement of the camera as recognized in step 220, the direction where the camera is moved is provided to a user via an appropriate user interface (UI). The direction of the camera movement may be displayed as an appropriate icon, etc. on the display unit.

For example, when it is detected by the motion vector $m_{i,x}$ of x-axis that the camera currently moves in a left/stop/right direction in a current "panoramic photography in progress mode" from left to right, a rightward arrow icon may be displayed on a preview screen so as to lead the movement of the camera in a proper direction for panoramic photography. Also, in the integration of the motion vector $m_{i,y}$ of y-axis as in formula (1) below, when the camera exceeds a preset threshold value (that is, $\tau_2$ in formula (1) below) in an upward and downward direction, an appropriate type icon for warning of the excessive movement may be displayed on a preview screen.

$$|\Sigma m_{i,y}| \leq \tau_2 \quad (1)$$

Then, in step 240, it is determined whether it is time to photograph each current (next) picture according to the movement of the camera as recognized in step 220. When it is time to photograph each current/next picture, the process proceeds to step 250, or otherwise, the process proceeds back to step 220, and the above steps are repeated.

For example, in the integration of the motion vector $m_{i,x}$ of x-axis as in formula (2) below in "current panoramic photography in progress mode" from left to right, when the integrated value reaches a preset threshold value (that is, $\tau_1$ in formula (2) below), it is determined that it is time to photograph a current/next picture.

$$\Sigma m_{i,x} \geq \tau_1 \quad (2)$$

In step 250, a corresponding picture is then photographed. The time for photographing a current picture may be provided to a user via an appropriate user interface (UI). Also, preset settings, for example, manual/automatic panoramic photography, allows the user to perform the photography operation by shutter, or otherwise. Automatic photography operation is performed. The settings for the above manual/automatic panoramic photography may be set when an environment setup operation for panoramic photography is performed in step 200.

In step 260, it is determined whether the number of pictures photographed reaches the total number preset in step 200. When the number is less than the total number, the process proceeds back to step 220, and the above steps are repeated. On the other hand, when the number has reached the total number, the panoramic photography process is completed.

When the process proceeds back to step 220, the values of the motion vectors, especially, the vector sum of the motion vector $m_{i,x}$ of x-axis (that is, $\Sigma m_{i,x}$), are reset as an initialized value (0). Also, after the panoramic photography is completed, respective photographed pictures are put together so as to create one panoramic image. In order to smoothly put together multiple pictures, general image processing mechanisms, including aligning, stitching, and blending, may be applied.

Referring to FIG. 2, when photographing a panoramic image, a user is required to move a photographing apparatus at regular intervals in a photography direction (for example, from left to right). In the present invention, it is assumed that image frames are input at substantially constant speed via such a mechanism, and every frame has no motion blur effect. Thus, pictures with a fixed width, which are automatically overlapped, are obtained. Accordingly, in the integration of motion vectors (that is, the motion vector $m_{i,x}$ of x-axis) of input images according to a photography direction (for example, from left to right), whenever the integrated value reaches a preset threshold value ($\tau_1$), a next picture is photographed. When the photography for a picture is set as an automatic mode, each picture included in a panoramic image is automatically photographed at an appropriate position (according to the threshold value $\tau_1$) while a user appropriately moves the photographing apparatus.

In recognizing the movement of the photographing apparatus in step 220 using a current input image and a previous input image, a motion vector between image blocks of frames is detected via a mechanism according to the principles of the present invention. Hereinafter, such a mechanism will be described in detail.

In the mechanism of matching image blocks of frames and detecting a motion vector, a motion estimation mechanism may be applied. Motion estimation mechanism is usually used for a video image (for example, broadcast images) compression technology, such as MPEG-4, H.264, etc. However, in actual panoramic photography, a preview image of a camera is used. Therefore, differently from broadcast images, exposure compensation is not properly done, and the correlation between preview frames is not strong. Accordingly, when a general motion estimation mechanism is applied, it is difficult to find an accurate matching block. Furthermore, the general motion estimation mechanism is a technology based on a compression mechanism, and requires a very complicated computation mechanism, such as motion vector detection with subdivided block (macroblock) sizes. Therefore, in consideration of characteristics of the panoramic photography, an appropriate motion vector estimation mechanism is required.

According to the present invention, movement from a previous frame to a current frame of input images is recognized by using an image block of a certain area, rather than using a general motion estimation mechanism. Thus, a motion estimation mechanism with exposure compensation is provided in consideration of principles of panoramic photography. In photography, a motion vector has to be quickly computed in such a manner that preview operation is normally performed during the computation. In order to reduce computational complexity, an integral image may be used. Also, a base block for finding a motion vector is variably adjusted according to a possible preview rate, and a relative size and distance of a photographed object. Herein, due to characteristics of a preview image, the correlation of frames is not stronger than a compression image. In order to maximize the correlation, it is possible to use a single-block search mechanism. In motion estimation of frames, instead of using a plane image, it is possible to perform the motion estimation on an image previously projected on a cylindrical panoramic projection space in consideration of characteristics of panoramic photography.

Figure 3:
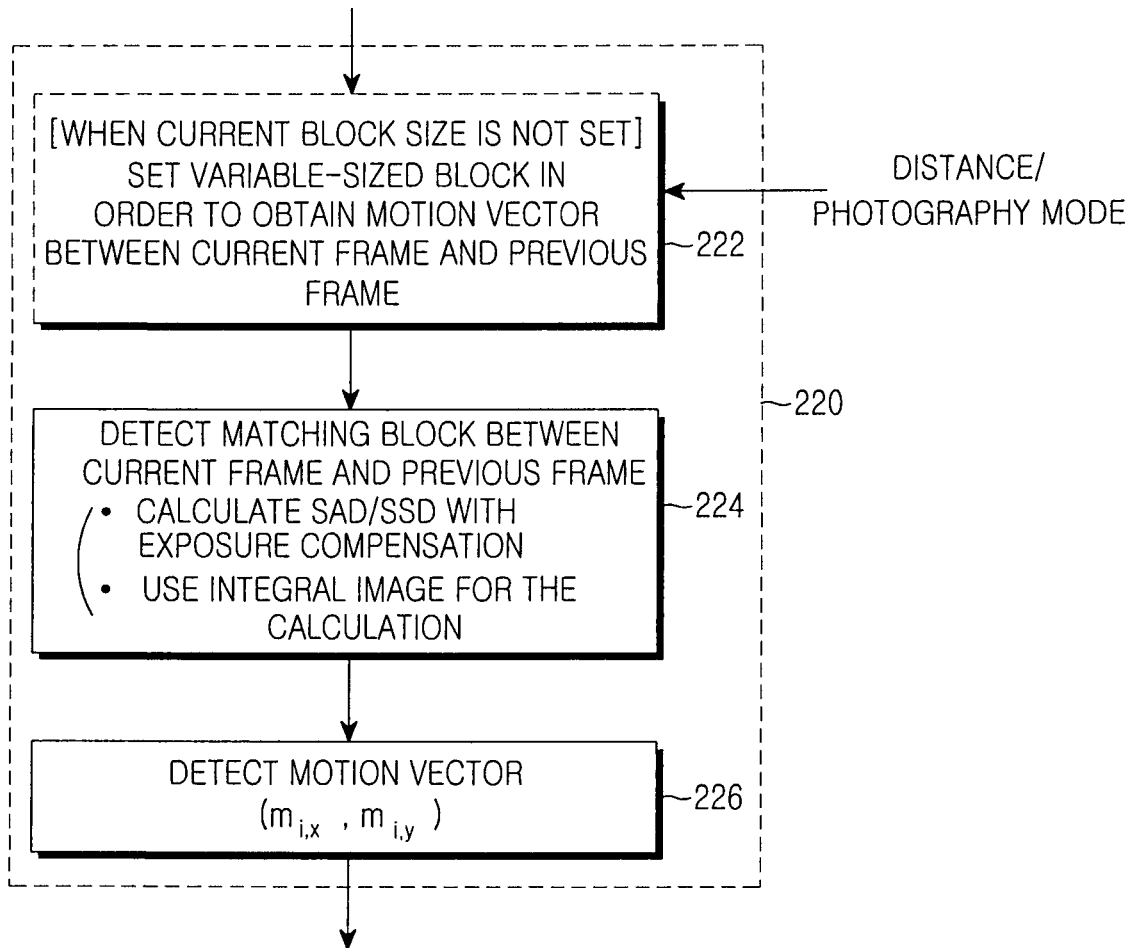
FIG. 3 is a detailed flow diagram illustrating steps for recognizing the movement of a camera in FIG. 2.

FIG. 3 is a detailed flow diagram illustrating steps for recognizing the movement of a camera. The operation of motion estimation according to the present invention will be described in detail with reference to FIG. 3. In step 222, in order to obtain a motion vector between a current frame and a previous frame, a variable size block is set.

In motion estimation on a preview image, especially, in the case of a mobile camera with a low-sensitivity sensor and hand-tremor, when the motion estimation is performed on a small size block (usually, a square block in a range of 4~16 pixels) in the manner of a video image compression mechanism, it is difficult to find an accurate motion vector value due to accumulated vector errors between blocks. Accordingly, in an embodiment of the present invention, the motion vector is detected on a few blocks (for example, just one block) with a relatively larger size.

Figure 4:
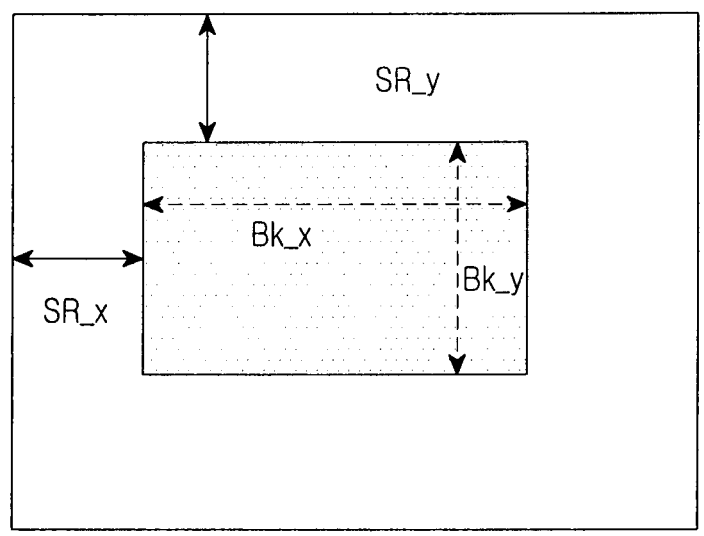
FIG. 4 is an example illustrating an image block with a variable size for detecting a motion vector in FIG. 3.

The size of the one block is variably adjusted by using the performance of a preview tool, the size and distance of a photographed object, and distance information on the area to be searched. FIG. 4 is an example illustrating a variably set size of a block within a frame. SR (Search Range) indicates the area to be searched, and Bk (Block size) indicates the size of the block.

A search range SR is an area for searching a block matching a base block within a frame to be searched. It is possible to set the entire area of the frame as the search range. On the other hand, instead of utilizing the entire image of the frame, it is possible to set an appropriate area as the search range. The search area may be determined based on the position of a base block within a frame to be searched. In this manner, it is possible to increase the efficiency by preventing unnecessary portions (such as the edges of a frame) from being searched.

In an embodiment of the present invention, it is possible to variably set such a search range and a block size. For example, when photographing an object at a short distance, or the object size is relatively large, a more accurate motion vector is obtained by increasing the block size, and decreasing the search range. On the other hand, when photographing an object at a long distance, or the object size is relatively small, a more accurate motion vector is obtained by decreasing the block size, and widening the search range.

In the case of a photographing apparatus with a low performance preview function, when the search range is excessively widened, it takes a lot of time to find a motion vector due to increased computational complexity, thereby decreasing a frame rate. Also, even if an accurate vector is obtained, the decreased frame rate may cause images between frames to be largely different from each other. As a result, errors causes by the difference are accumulated. Therefore, in extracting a motion vector from a camera preview, it is possible to obtain basic information on a photographed object by using object detector, automatic input information such as a focal length, etc., or user-manual input information, and to set the search range in accordance with a distance and a size of the object. The user-manual input information may include a distance and an object size, and may also be estimated based on user-set information including a short-distance mode, a scenery mode, and a portrait mode, etc. In addition, according to preview performance of a corresponding photographing apparatus, it is possible to set a basic block size in consideration of computational complexity.

The setup of a block with a variable size in step 222 is performed only once when the size of a current block is not set, that is, the first time when the extraction of a motion vector is performed. Then, until the panoramic photography is completed, a block with the first set size is used.

In step 224, a matching block between a current frame and a previous frame is detected by using a block with a size set in step 222. Basically, in detecting the matching block, error information of respective compared pixels between blocks is utilized. When the error between two blocks is the least (minimized), the corresponding block is considered a matching block.

Usually, for error information for detecting a matching block, an error function such as SAD (Sum of Absolute Difference) or SSD (Sum of Squared Difference) is used. SAD and SSD generally used in a video image compression technology are defined by formula (3) below.

$$SAD \quad (3)$$
$$E(m, n) = \sum_{x,y \in block} |I_1(x, y) - I_2(x+m, y+n)|$$

$$SSD$$
$$E(m, n) = \sum_{x,y \in block} \{I_1(x, y) - I_2(x+m, y+n)\}^2$$

In formula (3), $I_1$ and $I_2$ indicate pixel values (luminance or color) of corresponding positions on blocks within respective frames (that is, a previous frame and a current frame). Herein, x and y indicate a pixel position on a base block in a previous frame, and x+m and y+n indicate a pixel position on a searched block in a current frame.

Such functions can be appropriately applied when adjacent two frames have no difference in exposure, for example, in the case of a video image compression environment. However, when adjacent two frames have a difference in exposure, for example, in the case of a image frame directly input from a subject in an actual photography environment, it is difficult to use the functions as accurate information. Therefore, the present invention uses error functions reflecting the exposure difference as defined by formula (4) below.

$$modified\ SAD \quad (4)$$
$$E'(m, n) = \sum_{x,y \in block} |I_1(x, y) - \bar{I}_1 - (I_2(x+m, y+n) - \bar{I}_2(m, n)|$$

$$modified\ SSD$$
$$E(m, n) = \sum_{x,y \in block} \{I_1(x, y) - \bar{I}_1(I_2(x+m, y+n) - \bar{I}_2(m, n))\}^2$$

Herein, $\bar{I}_1$ and $\bar{I}_2$ indicate average values of pixels corresponding to blocks within respective frames (that is, a previous frame and a current frame). In formula (4), exposure compensation is performed by compensating the pixel values of each frame block in accordance with the average of the image block (in the case of formula (4), the average value is subtracted).

Since the position of a block in the previous frame is fixed (that is, a base block is known), there is no need to obtain $\bar{I}_t$ more than once. However, in the following frames, in order to find the best matching block, through the comparison with the current frame and the previous frame, it is required to search every block with the same size. Thus, whenever the search is performed, it is necessary to obtain the average value of pixels within a corresponding block. In other words, $I_2(m,n)$ has to be obtained with regard to every block.

Figure 5A:
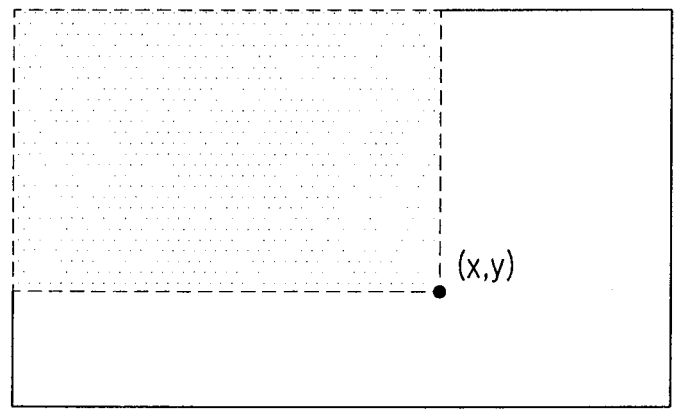
FIG. 5A and FIG. 5B illustrate integral images.

Herein, whenever the total sum and average value is obtained with regard to pixels of every block, computational complexity is increased. Accordingly, the present invention provides a mechanism for decreasing the computational complexity by using an integral image. In the integral image, a pixel value corresponding to coordinates indicates the total sum of pixels extending from the upper left side of the image to the coordinate. In other words, in FIG. 5A a pixel value of (x, y) indicates the total sum of pixels corresponding a dotted block area. Therefore, $I_{int\_g}(0, 0)$ indicates a pixel value at coordinates (0, 0), and $I_{int\_g}(width-1, height-1)$ indicates the total sum of all pixels of a given image.

Figure 5B:
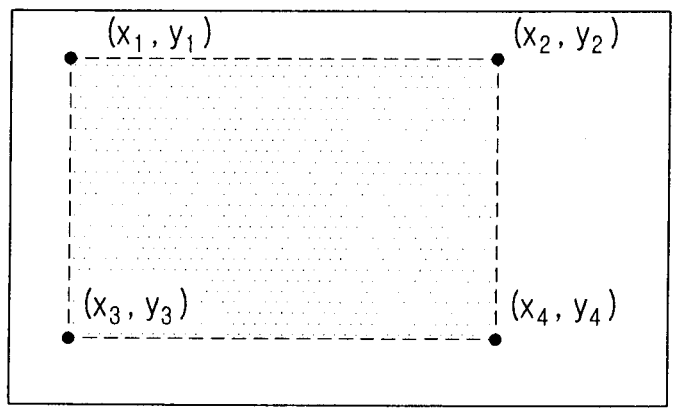

Through such an integral image, it is possible to obtain the total sum of pixels within a required area by using summation and subtraction of pixel values corresponding to four vertexes of the area. A total sum of pixels corresponding to a dotted block area in FIG. 5B can be obtained by using pixel values of four vertexes $(x_1,y_1)$, $(x_2,y_2)$, $(x_3,y_3)$, and $(x_4, y_4)$ through formula (5) defined below.

$$I_{int\_g}(x_4,y_4)+I_{int\_g}(x_1,y_1)-I_{int\_g}(x_2,y_2)-I_{int\_g}(x_3,y_3) \quad (5)$$

According to an embodiment of the present invention, an integral image with regard to a current frame is previously obtained as described above, and then, the average of pixels with regard to every block, that is, $\bar{I}_2(m, n)$, can be simply obtained by using such an integral image.

After the detection of a matching block between a current frame and a previous frame in step 224, a motion vector between two blocks (that is, a motion vector $m_{i,x}$ of x-axis, and a motion vector $m_{i,y}$ of y-axis) is obtained in step 226.

A method for photographing a panoramic image according to an embodiment of the present invention is performed as described above. Although a specific embodiment has been described, it will be obvious that various modifications and variations can be made within the scope of this invention.

Usually, a motion vector is detected with regard to a plane image. Such detection is efficient only for general compression images and broadcast images. On the other hand, in the case of panoramic photography, information on a motion vector is required in order to obtain a more accurate panoramic image. In another embodiment of the present invention, after panoramic photography, each image may be projected again on a mosaic plane or a curved plane because consecutive pictures obtained for a panoramic image make a cylindrical form as a camera rotates in a circle. Accordingly, in detection of a motion vector, in consideration of image movement in a curved form, not a plane form, an input image is projected on an appropriate projection plane (for example, a cylindrical plane), and then, the motion vector is detected with regard to the projected image. As a result, it is possible to obtain a more accurate value.

Also, a motion vector is determining a preview image for which a panoramic image is input in real time, and whether to photograph an image is determined by using information on the motion vector. In consideration of such a characteristic, a motion vector may be determined by skipping some frames according to a preview rate of an photographing apparatus. Usually, in a case of video image compression, since vector information of each frame is important, a motion estimation operation has to be performed per frame. However, in a motion estimation operation for panoramic photography according to the present invention, the information of each frame is less important. Accordingly, in another embodiment of the present invention, a motion estimation operation may be performed by appropriately skipping some frames (for example, 1~2 frames) according to related environments. In such a case, computational time and complexity may be reduced, and thus, a wider search range is secured. As a result, it is possible to calculate a more accurate motion vector.

The above-described methods according to the present invention can be realized in hardware or via the execution of software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

In addition, although in panoramic photography, a photographing apparatus according to the present invention is moved by a user as described above, the principles of the invention can be applied when the photographing apparatus according to the present invention is mounted to an additional moving device, and is automatically moved. Also, although in the above description, panoramic photography is in a horizontal or a vertical direction, the principles of the invention can be applied when the panoramic photography is in a horizontal-vertical mixed direction (that is, multiple pictures included in a panoramic image are disposed with a horizontal/vertical mosaic style). Besides, the above various UIs may be expressed as various ways different from the above description.

As described above, in panoramic photography according to the present invention, movement information on a terminal mounted with a camera is recognized through an image processing operation. Then, it is automatically determined whether it is time to photograph an image. Accordingly, without an auxiliary device or additional hardware, a user can easily and accurately photograph an image.

Especially, in motion vector detection according to the present invention, a motion estimation mechanism in accordance with the characteristics of a preview image of a camera is used. The size of a base block for detecting a motion vector is appropriately and variably set, and thus it is possible to more simply and accurately extract a motion vector.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An electronic device comprising:
    an image sensor;
    a processor;
    a display; and a memory storing a plurality of instructions, wherein the plurality of instructions executed by the processor cause the electronic device to perform a plurality of operations comprising:
in response to receiving an input, start capturing of a horizontal panoramic image;
determining an amount of movement of the electronic device in a vertical direction during capturing of the horizontal panoramic image;
when the amount of movement in the vertical direction satisfies a threshold condition, displaying, on a preview screen of the display, a visual indication relating to an excessive vertical movement, during capturing of the horizontal panoramic image; and
completing capturing of the horizontal panoramic image.

2. The electronic device of claim 1, wherein the amount of movement of the electronic device is determined based on a first image and a second image obtained from the image sensor.

3. The electronic device of claim 2, wherein the amount of movement of the electronic device is determined by comparing the first image and the second image obtained from the image sensor.

4. The electronic device of claim 1, wherein the capturing of the horizontal panoramic image is completed based on a first image and a second image obtained from the image sensor.

5. The electronic device of claim 1, the plurality of operations further comprising displaying, on the preview screen of the display, an icon for indicating a capturing direction.

6. The electronic device of claim 5, wherein the icon for indicating the capturing direction is at least a shape of arrow direct to the capturing direction.

7. An electronic device comprising:
an image sensor;
a processor;
a display; and
a memory storing a plurality of instructions, wherein the plurality of instructions executed by the processor cause the electronic device to:
in response to receiving an input, start capturing of a panoramic image in a direction selected from a horizontal direction and a vertical direction;
determine movement information for the electronic device during capturing of the panoramic image;
when the movement information for the electronic device satisfies a threshold condition, display on a preview screen of the display a visual indication relating to an excessive movement, wherein:
when the direction selected is the horizontal direction, determining the movement information for the electronic device comprises determining an amount of movement of the electronic device in the vertical direction, and the excessive movement is an excessive vertical movement; and
when the direction selected is the vertical direction, determining the movement information for the electronic device comprises determining an amount of movement of the electronic device in the horizontal direction, and the excessive movement is a horizontal movement; and
complete capturing of the panoramic image based at least in part on a first image and a second image obtained by the image sensor.

8. The electronic device of claim 7, wherein the amount of movement of the electronic device is determined based on the first image and the second image obtained from the image sensor.

9. The electronic device of claim 8, wherein the amount of movement of the electronic device is determined by comparing the first image and the second image obtained from the image sensor.

10. The electronic device of claim 7, wherein the capturing of the panoramic image is completed based on the first image and the second image obtained from the image sensor.

11. The electronic device of claim 7, the plurality of instructions further comprising display, on the preview screen of the display, an icon for indicating the direction selected.

12. The electronic device of claim 11, wherein the icon for indicating the direction selected is at least a shape of arrow directed to the direction selected.

13. A method for generating at least one image with an electronic device comprising an image sensor and a display, the method comprising:
in response to receiving an input, start capturing of a horizontal panoramic image;
determining an amount of movement of the electronic device in a vertical direction during capturing of the horizontal panoramic image;
when the amount of movement in the vertical direction satisfies a threshold condition, displaying, on a preview screen of the display, a visual indication relating to an excessive vertical movement, during capturing of the horizontal panoramic image; and
completing capturing of the horizontal panoramic image.

14. The method of claim 13, wherein the amount of movement of the electronic device is determined based on a first image and a second image obtained from the image sensor.

15. The method of claim 14, wherein the amount of movement of the electronic device is determined by comparing the first image and the second image obtained from the image sensor.

16. The method of claim 13, wherein the capturing of the horizontal panoramic image is completed based on a first image and a second image obtained from the image sensor.

17. The method of claim 13, further comprising displaying, on the preview screen of the display, an icon for indicating a capturing direction.

18. The method of claim 17, wherein the icon for indicating the capturing direction is at least a shape of arrow direct to the capturing direction.

19. A method for generating at least one image with an electronic device comprising an image sensor and a display, the method comprising:
in response to receiving an input, start capturing of a panoramic image in a direction selected from a horizontal direction and a vertical direction;
determining movement information for the electronic device during capturing of the panoramic image;
when the movement information for the electronic device satisfies a threshold condition, displaying on a preview screen of the display a visual indication relating to an excessive movement, wherein:
when the direction selected is the horizontal direction, determining the movement information for the electronic device comprises determining an amount of movement of the electronic device in the vertical direction, and the excessive movement is an excessive vertical movement; and when the direction selected is the vertical direction, determining the movement information for the electronic device comprises determining an amount of movement of the electronic device in the horizontal direction, and the excessive movement is a horizontal movement; and completing capturing of the panoramic image based at least in part on a first image and a second image obtained by the image sensor.

20. The method of claim 19, wherein the amount of movement of the electronic device is determined based on the first image and the second image obtained from the image sensor.

21. The method of claim 20, wherein the amount of movement of the electronic device is determined by comparing the first image and the second image obtained from the image sensor.

22. The method of claim 19, wherein the capturing of the panoramic image is completed based on the first image and the second image obtained from the image sensor.

23. The method of claim 19, further comprising displaying, on the preview screen of the display, an icon for indicating the direction selected.

24. The method of claim 23, wherein the icon for indicating the direction selected is at least a shape of arrow directed to the direction selected.

* * * * *